UNITED STATES PATENT OFFICE.

LEONARD CHARLES MUNN, OF STOURPORT, ENGLAND.

CASE-HARDENING COMPOUND.

1,286,061.      Specification of Letters Patent.      Patented Nov. 26, 1918.

No Drawing.      Application filed February 12, 1917. Serial No. 148,215.

*To all whom it may concern:*

Be it known that I, LEONARD CHARLES MUNN, a subject of the King of Great Britain, residing at Titton Cottage, Stourport, Worcestershire, England, have invented certain new and useful Improvements in Case-Hardening Compounds, of which the following is a specification.

My invention consists of the improvements hereinafter described in or relating to the material used in the case-hardening of articles of iron and steel, the said improvements having for their object to obviate the disadvantages attending the use of the well known "barium carbonate and charcoal" mixture ordinarily used for the said purpose.

According to text books the proportion of barium carbonate to charcoal which affords the best results is 40% of the barium carbonate to 60% of charcoal by weight.

The charcoal of the ordinary barium carbonate and charcoal mixture being a bad conductor of heat, especially when in a finely divided state, is employed in the mixture in the form of coarse granules and this condition taken in conjunction with the different densities or specific gravities of the charcoal and barium carbonate, which latter is in fine powder, renders the obtaining of a uniform mixture of the ingredients or uniform distribution of the barium carbonate throughout the mass of charcoal practically impossible, the two substances in the handling of the mixture both when storing the same in the storage bins and when introducing the same into the pots in which the case hardening process is effected, tending to separate one from the other and consequently the use of the ordinary barium carbonate and charcoal mixture is attended with great want of reliability and uniformity in effect on the iron or steel articles subjected to the case hardening treatment.

To render the materials inseparable it has been proposed to employ in the mixture an ingredient which will soften or fuse on a preliminary heating of the mixture, the softened or fused ingredient becoming a binding agent.

According to my invention I produce a barium-carbonate-charcoal compound or mixture in which the barium carbonate or its equivalent, for example, a barium salt which in the case-hardening process is converted into barium carbonate, is deposited on and in the pores or interstices of the granules of any carbonaceous material of a porous nature used in case-hardening, an even distribution of the barium carbonate throughout the carbonaceous material (wood charcoal, burnt leather or the like) being thereby insured, the intermixing of the two ingredients being such that accidental separation is rendered practically impossible.

The preparation of the new or improved compound or mixture constituting my invention may be effected in various ways. For example, I may treat the carbonaceous material, reduced to coarse granules and preferably freed from dust or fine powder as heretofore, with a hot concentrated solution of barium hydrate and after any excess of the solution has drained away the material so treated is exposed to the atmosphere and thereby the hydrate is spontaneously converted into carbonate by the absorption of carbon dioxid from the air; or the material is exposed to the action of gases rich in carbon dioxid, such for example as waste furnace or flue gases; or the barium hydrate in the carbonaceous material may be converted into barium carbonate by passing carbon dioxid gas through the carbonaceous material.

The mixture or compound of barium carbonate and charcoal obtained is dried before use.

The conversion of the barium hydrate with which the carbonaceous material is impregnated into barium carbonate may be conveniently effected by exposing the carbonaceous material to waste gases charged with carbonic acid, such, for example, as waste furnace gases which may be passed through the material.

The tower or duct is provided with a door through which the carbonaceous mixture is removed and the tower or duct may be of such a capacity as to hold a supply sufficient for several days' requirements, and portions of the mixture may be withdrawn daily as by the time the mixture has passed through the tower or duct it will be dry and the barium hydrate will be completely converted into carbonate.

Or the carbonaceous material may be impregnated with a cold solution of barium carbonate in water charged with carbon dioxid gas under pressure, the solution of barium being probably a bi-carbonate. The impregnated mixture is dried at a heat sufficient to drive off the excess of carbon dioxid, barium carbonate being thereby left on and in the pores of the carbonaceous material.

Or the carbonaceous material may be treated with a hot solution of a soluble salt of barium for example barium chlorid, the barium as barium carbonate being precipitated in the pores of the carbonaceous material by treating the said material with an excess of a soluble carbonate, such for example as sodium carbonate. The soluble chlorid formed in the reaction is removed by washing and the compound or mixture is then dried.

Or the carbonaceous material may be treated with a hot solution of a soluble organic salt of barium, such for example as would be obtained by dissolving oxid or carbonate of barium in excess of pyroligneous acid, a crude acetate being thus obtained. This, when employed in case-hardening is converted by heat into carbonate before the pot reaches cementation temperature.

In making the solutions hereinbefore referred to soft water should be used.

I wish it to be understood that I do not limit myself to any definite percentage of barium carbonate but 25% to 30% of barium carbonate in the compound will be found to give satisfactory results.

From the foregoing description it will be understood that the barium carbonate or its equivalent in the new or improved compound or mixture is deposited on and in the pores of the carbonaceous material and hence it cannot be shaken to the bottom of the pots however carelessly they may be handled and a reliability and uniformity in the case-hardening process results unattainable by the use of the ordinary mechanical mixtures of barium carbonate and charcoal. Further, as the barium carbonate is more intimately associated with and evenly distributed in the charcoal than in the ordinary mechanical mixtures heretofore employed less barium carbonate is required with the charcoal to obtain the same or a similar effect.

In some cases, depending on the articles to be case-hardened, it may be advantageous, although not essential, to add crude mineral oil, say about 20% to the compound or mixture obtained as above described, the oil serving to remove excess of air included in the pots and minimizing the "tarnishing" of the articles treated and further effecting economy in the carbon in the compound.

I claim:

1. In the preparation of compounds or mixtures to be used in the case-hardening of articles of iron and steel, impregnating porous carbonaceous material, such as charcoal with a solution of barium hydrate or a salt of barium in solution and subsequently converting the barium of the barium hydrate or soluble salt of barium which has been absorbed by the carbonaceous material into a carbonate whereby an even distribution of barium carbonate on and in the pores of the carbonaceous material is obtained.

2. The process or method of preparing the barium carbonate and charcoal mixture to be used in the process of case-hardening articles of iron and steel consisting in exposing porous carbonaceous material in granular form which has been treated with a solution of barium hydrate to air or waste gases charged with carbon dioxid whereby the barium hydrate in and on the carbonaceous material is converted into barium carbonate.

3. In the preparation of compounds or mixtures to be used in case-hardening, a process of treating porous carbonaceous material such as charcoal, for the purpose of uniformly depositing on and in the porous material an insoluble and infusible activifier, such as barium carbonate, consisting of first taking a solution of the hydrate of the base, for example barium hydrate, and treating the porous material with said solution and afterward treating the same for the purpose of converting the base into an insoluble and infusible carbonate.

4. In the preparation of compounds or mixtures to be used in the case-hardening of iron and steel, depositing uniformly on and in the pores of a porous carbonaceous material, such as charcoal, an insoluble and infusible activifying agent such as barium carbonate, by first impregnating said carbonaceous material with a solution of the hydrate of the base or a salt of the base in solution and subsequently treating the mixture to convert the base into a carbonate and to effect an even distribution of such carbonate on and in the pores of the carbonaceous material.

In testimony whereof I have hereunto set my hand.

LEONARD CHARLES MUNN.

Witnesses:
AUGUSTA STEPHENS,
BEATRICE V. WHEATON.